C. B. KING, B. JACOBY AND C. S. JOHNSON,
OPERATING DEVICE FOR BRAKES, CLUTCHES, AND THE LIKE.
APPLICATION FILED JUNE 18, 1917.

1,319,008.

Patented Oct. 14, 1919.
4 SHEETS SHEET 3.

INVENTOR.
Charles B King
Benjamin Jacoby
Charles S Johnson
ATTORNEY

UNITED STATES PATENT OFFICE.

CHARLES B. KING AND BENJAMIN JACOBY, OF MARION, OHIO, AND CHARLES S. JOHNSON, OF GALESBURG, ILLINOIS, ASSIGNORS TO THE MARION STEAM SHOVEL COMPANY, OF MARION, OHIO, A CORPORATION OF OHIO.

OPERATING DEVICE FOR BRAKES, CLUTCHES, AND THE LIKE.

1,319,008.  Specification of Letters Patent.  Patented Oct. 14, 1919.

Application filed June 18, 1917. Serial No. 175,293.

*To all whom it may concern:*

Be it known that we, CHARLES B. KING and BENJAMIN JACOBY, citizens of the United States, residing at Marion, in the county of Marion and State of Ohio, and CHARLES S. JOHNSON, a citizen of the United States, residing at Galesburg, in the county of Knox and State of Illinois, have invented certain new and useful Improvements in Operating Devices for Brakes, Clutches, and the like. of which the following is a specification, reference being had therein to the accompanying drawings.

This invention relates to operating devices for brakes clutches and the like, and it is designed more particularly for use with electrically operated excavating mechanisms, although it is not to be understood that the invention is limited to use with such mechanisms.

The object of the invention is to provide an operating device for the brake, or clutch, as the case may be, which controls an operative part of the mechanism which operating device will be controlled by the device which controls the operation of said operative part, whereby the brake or clutch will be operated in properly timed relation to the application of power to said operative part; and to provide such a device which will be simple in construction and positive in operation. It is also an object of the invention to provide an electrically controlled operating device of this kind, the circuit for which can be controlled by the controller for the motor which drives the operative part of the mechanism. Other objects of the invention will appear as the mechanism is described in detail.

In the accompanying drawings

In carrying out our invention we have provided mechanism for holding the movable member of a friction clutch, or brake, in a given position and for moving the same from that position. This mechanism preferably comprises a spring tending to move the friction member in one direction and a fluid operated device adapted to move the friction member in the opposite direction against the tension of the spring. The flow of fluid to the fluid operated device is controlled by a valve, the operation of which is, in turn, controlled by the device for controlling the application of power to that part of the mechanism which is controlled by the brake or clutch. Ordinarily we prefer to provide electrical means for actuating the valve, and where the device is applied to electrically operated machines we provide the circuit for this electrically operated device with a switch which is actuated by the controller for the motor, or motors, which operate that part of the mechanism to which the brake or the clutch is applied. In the present drawings we have illustrated the invention as applied to a brake, and also as applied to a clutch, the two forms of the invention being similar in their essential characteristics, but differing in such a manner as to accommodate them to the different uses to which they are put. It will be understood, however, that these two forms of the invention are chosen for the purpose of illustration only and that the invention may be applied to mechanisms of various kinds, and that the essential characteristics of the invention may be embodied in devices of various kinds.

Figure 1:
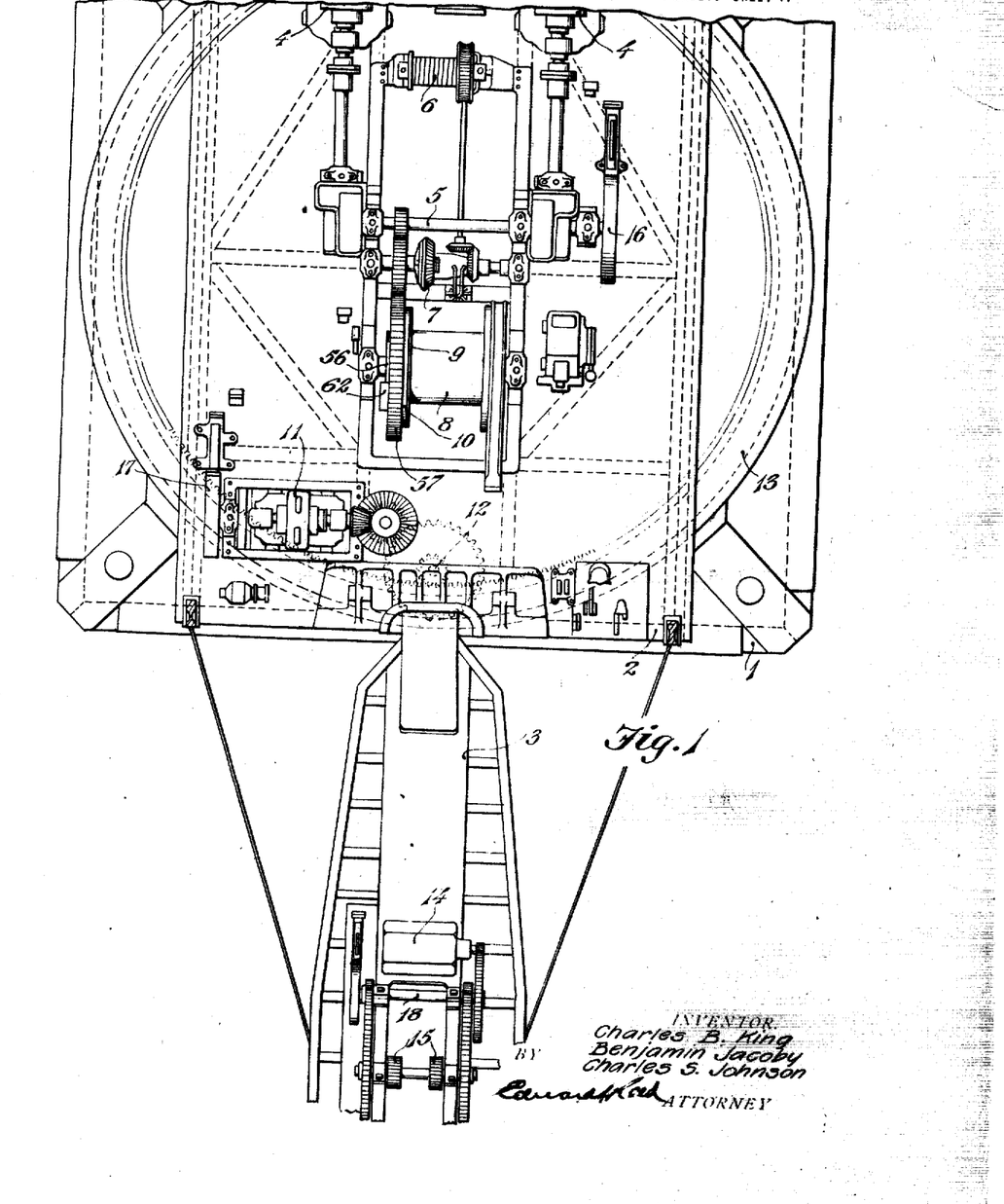
Figure 1 is a plan view, partially broken away, of an electrically operated shovel showing our invention applied thereto.

As here illustrated the invention is applied to a revolving shovel of well known construction, which comprises a base 1 having revolubly mounted thereon a platform 2, at the forward end of which is a boom 3 carrying the usual excavating devices, which are not here shown. Mounted on the platform 2 are two motors 4 connected through suitable shafts and gearing with a shaft 5, which in turn is connected through suitable gearing with a boom hoist 6, and with a gear 7 which actuates the propelling devices for advancing the machine as a whole. The shaft 5 is also geared to a hoisting drum 8, a suitable clutch being interposed between the driving mechanism and the drum. In the present instance the drum is loosely mounted on the shaft and is provided with a friction drum 9 about which extends a friction band 10 of ordinary construction, the clutch being operated in a manner which will be hereinafter described. The swinging of the shovel is accomplished by a separate motor 11, the shaft of which is geared to a pinion 12 meshing with an annular rack 13 secured to the base 1. A crowding motor 14 is mounted on the boom and is connected by suitable gearing with the pinions 15 which operate the dipper handle. Each of the motor operated devices is provided with a separate brake, and a separate controlling device therefor. In the case of the motors 4 the brake is applied to the shaft 5 to which the motors are geared, as shown at 16. In case of the rotating motor 11 it is mounted directly on a motor shaft, as shown at 17, while in the case of the crowding mechanism on the boom the brake is applied to a counter shaft 18. In each instance the brake and the operating devices therefor are substantially the same and we will describe but one of these mechanisms, and it will be understood that this description applies to the three brakes here shown, and to such others as it may be desired to employ.

Figures 2, 3, 6:
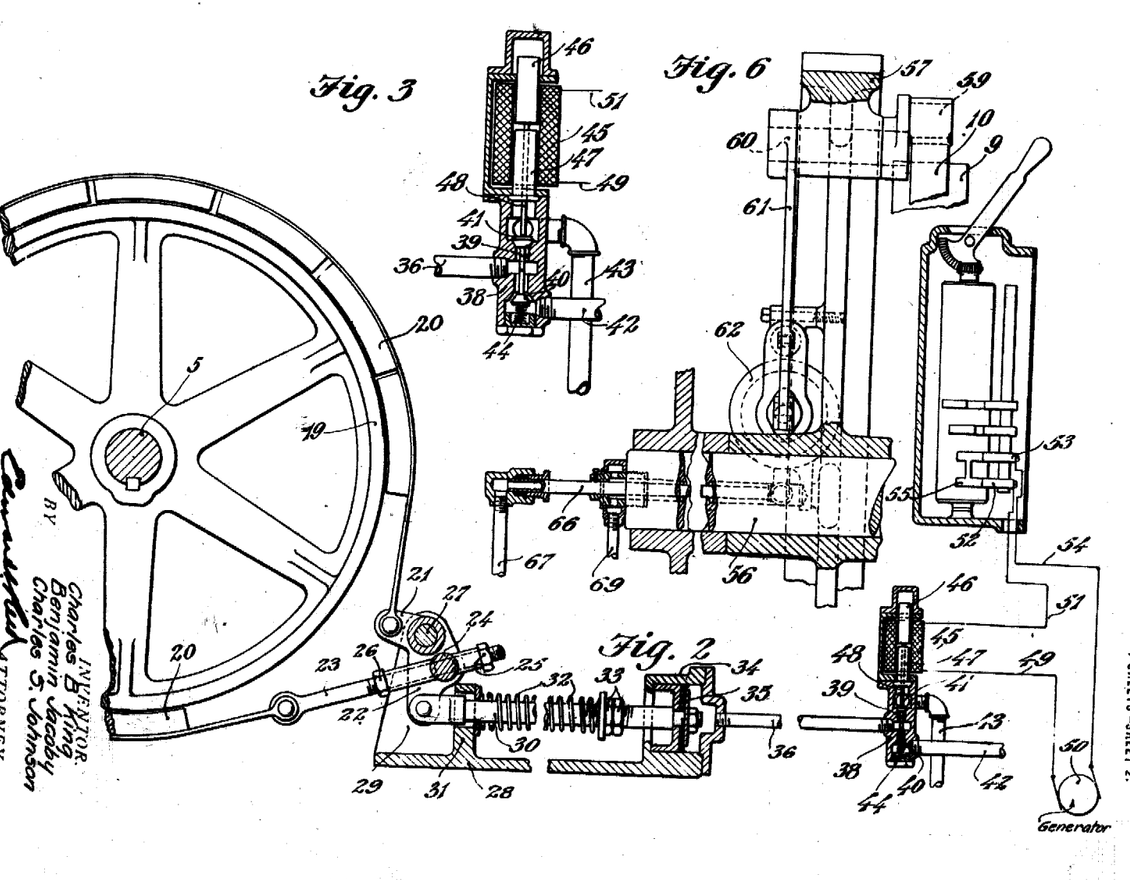
Fig. 2 is an elevation, partly in section, showing our invention applied to a brake.
Fig. 3 is an enlarged detail view of the magnetic valve for the mechanism of Fig. 2.
Fig. 6 is a detail view showing the manner in which the air pipes are connected with the clutch of Fig. 4.

In Fig. 2 of the drawings we have illustrated one of the brake mechanisms and have shown the same as comprising a friction drum 19 which may be mounted on any one of the shafts mentioned, for example, the shaft 5, and extending about this drum is a friction band 20, of ordinary construction. The friction band may be moved into and out of operative engagement with the drum or coöperating friction member by any suitable means. In the present instance the two ends of the band are connected with an operating lever, on the opposite sides of the fulcrum thereof. This lever is shown in the form of a bell-crank having one arm, 21, pivotally connected with one end of the band 20 and having its other arm 22 pivotally connected with the opposite end of the band 20. The connection between the arm 22 and the friction band is preferably adjustable, and in the present instance comprises a bolt 23 pivotally connected to the end of the band and extending through an apertured pin 24 on the lever. Nuts 25 and 26 threaded on the bolt, on opposite sides of the pin 24, serve to adjust the connection and regulate the amount of movement of the bell-crank lever necessary to operate the brake. The bell-crank is pivotally mounted on a base 28 which is here shown as provided with upwardly extending side members 29 to receive a pin 27 on which the bell-crank lever is mounted. It will be understood, however, that this particular type of brake and the operating lever therefor are chosen for the purpose of illustration and that the invention is applicable to brakes of various kinds, one or both members of which may be movable, and that the movement may be imparted to the movable member, or members, through devices adapted to the particular type of brake employed. The operating mechanism for the brake, as here illustrated, comprises a spring to move the friction band in one direction and a fluid operated device to move the band in the opposite direction, against the tension of the spring. In the arrangement here shown the spring tends to move the brake band into operative engagement with the friction drum and to hold the brake normally set. To this end we have pivotally connected with the arm 22 of the bell-crank lever, which actuates the brake band, a rod 30 which extends through and is slidably mounted in a bearing lug 31 carried by the base 28. Coiled about the rod 30 and confined between the lug 31 and a stop on the rod, is a spring 32, the expansion of which tends to rock the bell-crank lever in a direction to draw the friction band tightly about the friction drum. Preferably the stop on the rod 30 is adjustable and is here shown as comprising a nut 33 screw-threaded onto the rod. To release the brake, and permit the shaft 5 to rotate, the fluid operated device is applied to the brake in such a manner as to actuate the movable member thereof against the tension of the spring 32. This may be accomplished in various ways, but the arrangement here shown is simple and efficient. In this arrangement we have mounted near the end of the base 28 a cylinder 34 which, in the present instance, is cast integral with the base, and have mounted in the cylinder a piston 35, which is connected with the rod 30, the inner end of the cylinder having an opening to permit the passage of the rod. The outer end of the cylinder is connected by a suitable conduit, such as the pipe 36, with a source of fluid supply, such as an air compressor, and a suitable device is provided to control the flow of air to the cylinder. It will be obvious that by admitting air to the cylinder the piston will be moved rearwardly, the spring 32 compressed, and the bell-crank lever actuated to release the brake band, the several parts thus assuming the positions shown in Fig. 2.

The flow of fluid to the cylinder 34 is controlled by suitable valve mechanism which, in the present instance, comprises a valve housing 38 having a longitudinal passageway 39 which is connected between its ends with the conduit 36 and is provided on opposite sides of said conduit with valve members 40 and 41, which control the communication of the conduit 36 with a fluid supply pipe 42 and an exhaust pipe 43, respectively. In the particular arrangement here shown the valves are ordinary puppet valves having their stems extending into the passage-way 39 and of such length that when one valve is seated the stem will engage the stem of the other valve and move that valve off its seat. The inlet valve 40 is held normally in its closed position by means of a spring 44, thus interrupting the flow of fluid to the cylinder and permitting the air in the cylinder to exhaust through the pipe 43. A suitable device is provided to move the inlet valve to its open position against the spring 44 and we prefer to employ for this purpose an electro-magnet of suitable construction. As here shown this electro-magnet is in the form of a solenoid 45 having its core formed in two parts, the upper part, 46, being movable and the lower part, 47, being fixed against movement and having a central opening to form a guideway for a rod 48 secured to the movable part 46 of the core and adapted to engage the exhaust valve 41, when the solenoid is energized and the movable part of the core drawn into the same, and thus close the exhaust valve and open the inlet valve. The circuit for the solenoid is provided with a switch which is preferably connected with, or controlled by, a controlling device, which controls the operation of the part to which the brake is applied, that is, in the present instance, the shaft 5. Inasmuch as the shaft 5 is, in the present machine, operated by electric motors we have connected the switch for the solenoid circuit with, and embodied the same in, a controller for said motors. In the present instance, the solenoid is connected by a conductor 49 with a source of electrical energy, which is here shown diagrammatically as a generator 50. The other end of the solenoid is connected by a conductor 51 with a contact member 52 of the switch, and the other contact member 53 of the switch is connected by a conductor 54 with a source of electrical energy. In order that the switch may be closed either simultaneously with, or just in advance of, the closing of the circuit through the motors, we have mounted a contact bar 55 on the movable member of the controller, and have arranged the same adjacent to the first regular contact bar on that member in such a position that the two movable contact members will engage the contact members 52 and 53, which are carried by the support for the fixed contacts of the controller. The movable contact member is mounted with such relation to the first contact member of the controller that it will engage its fixed contact member simultaneously with, or just in advance of, the engagement of the first contact bar of the controller with its coöperating contact member, thus causing the solenoid to be energized, the valve opened and air admitted to the cylinder to compress the spring and actuate the movable member of the brake to release the part controlled by the brake at the same time the current is admitted to the motor. Likewise it will be obvious that when the current is cut off from the motor the switch 52—53 will be opened to break the circuit through the solenoid, thus deënergizing the same and permitting the inlet valve to be closed and the exhaust valve opened, thereby releasing the spring and permitting the same to expand and set the brake.

Figure 4:
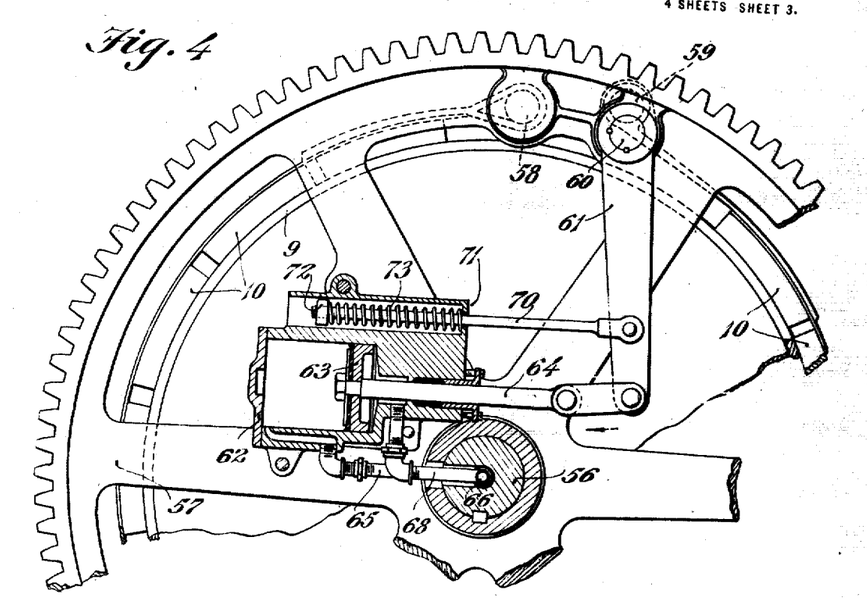
Fig. 4 is a side elevation, partly broken away, of a friction clutch showing an operating device for the movable member thereof.
Figure 5:
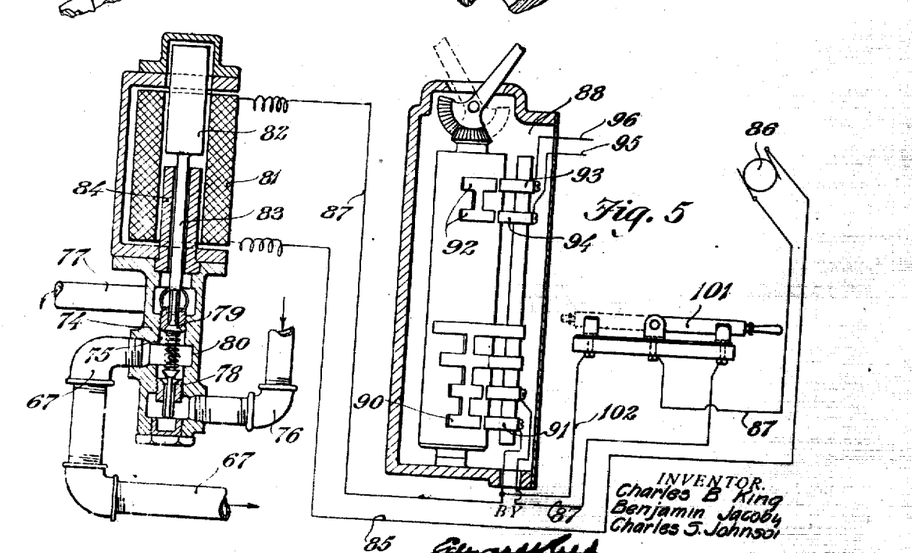
Fig. 5 is a detail view, partly in section, showing the controlling devices for the operating device of Fig. 4.

In applying the operating device to a clutch it will be apparent that the movable member of the coöperating friction devices must be moved into engagement with the other member thereof when power is applied to that part which is controlled by the clutch, and in Figs. 4 and 5 we have shown such a mechanism together with the controlling devices therefor. The device here illustrated is applied to the hoisting drum 8. As has been stated, the hoisting drum is loosely mounted on its shaft, here shown at 56, and is provided with a friction surface or drum 9, with which coöperates a friction band 10, the latter being carried by a suitable rotatable supporting structure, as shown at 57, which, in the present instance, comprises a gear keyed to the shaft 56. In the arrangement of the clutch here shown, one end of the band is secured to a fixed pin 58 mounted in the supporting member 57 and the other end of the band is connected with a pin 59, operatively connected with and spaced from a rock shaft, or stud, 60, mounted in the supporting member 57 and having an operating arm 61. It will be apparent that the movement of the arm 61 in one direction will tend to tighten the band about the drum while the movement of the arm in the opposite direction will move the band away from the drum and release the latter therefrom. In applying our invention to a clutch of this kind we utilize a spring to move the arm in one direction and a fluid operated device to move the arm in the opposite direction in the same manner as above described. In the particular arrangement here illustrated, however, the friction band is held in its operative position by means of the fluid operated device, and is held in its inoperative position by means of the spring. It will be obvious, however, that in either form of the device, or any modification thereof, either the spring or the fluid operated device may be utilized to hold the movable member of the clutch or brake in operative engagement with the other member thereof, this being a matter to be determined by the conditions surrounding each application of the invention. In the present instance we have mounted on the supporting member 57 a cylinder 62 having mounted therein a piston 63 connected by a piston rod 64 with the arm 61 and having the space in front of the piston connected by a pipe 65 with a conduit 66 arranged centrally of the shaft 56, the pipe, or conduit, 66, being connected at its outer end with a pipe 67 leading to the source of air supply and the controlling valve therefor. (See Fig. 6). An exhaust pipe 68 leads from the cylinder in the rear of the piston to the atmosphere and preferably is connected with the passage-way extending through the shaft 56 about the pipe 66 and communicating with a drain-pipe 69. Although the cylinder exhausts through the supply pipe 65, the relief pipe 68 in the rear of the piston is desirable to relieve the rear portion of the cylinder of any pressure which might be due to the leakage of air about the piston, and further to permit the draining of any moisture which might accumulate therein from condensation. This mechanism is substituted for and is arranged in substantially the same manner as the steam ram commonly employed for operating such a clutch on steam shovels. Connected with the arm 61 near its point of connection with the piston rod 64 is a second rod 70 which extends through an apertured lug 71 carried by the casting for the cylinder 62 and, in the present instance, forming the end wall of an elongated chamber. Coiled about the rod 70 and confined between the lug 71 and a stop, such as a nut 72, on the rod is a spring 73 which serves to move the arm 61 in the direction of the arrow and to move the band into its inoperative position.

The admission of air to the cylinder 62 to move the arm 61 in the direction opposite that indicated by the arrow, against the tension of the spring, is controlled by a valve mechanism similar to that shown in Fig. 2 and heretofore described, but having the valves rearranged. As in the valve above described, the valve structure comprises a housing 74 having a longitudinal passage-way 75 communicating at its opposite ends with a supply pipe 76 and an exhaust pipe 77, respectively. Connected with the passage 75 between its ends is the air supply pipe 67 leading to the cylinder. The valve structure is provided near its opposite ends with inwardly opening valve seats to receive puppet valves 78 and 79, which have their stems arranged in such relation one to the other that the movement of the one valve into its open position will move the other into its closed position. A spring 80 coiled about the stems of the valves tends normally to move both of them to their closed position, but the strength of this spring is such that it will be overcome by the pressure of the air from the supply pipe 76 and held normally in its open position, and through the coöperation of the valve stems will hold the exhaust valve in its closed position. The valve is actuated by a solenoid 81, the movable portion 82 of the core of which has connected therewith a rod 83 extending through the fixed portion 84 of the core and arranged to engage the exhaust valve and move the same to its open position and to thus seat the inlet valve against the pressure of the air. It will be apparent that with a controlling mechanism arranged as described the fluid pressure will normally be exerted upon the actuating arm 61 of the clutch to cause the movable member thereof to operatively engage the friction drum and that this frictional engagement will be interrupted only when the solenoid is energized to open the exhaust valve 79 and close the inlet valve 78, thus relieving the fluid pressure on the actuating arm 61 and permitting the same to be operated by the spring 73 to move the band into its inoperative position.

Figure 7:
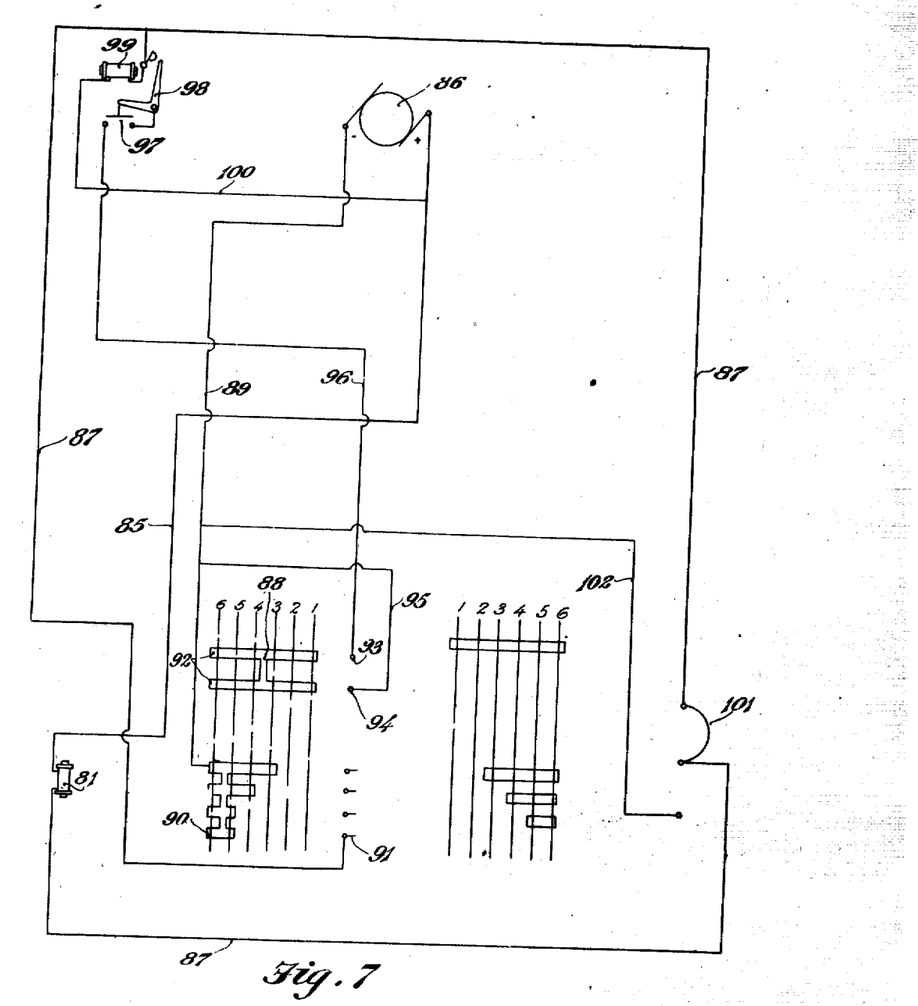
Fig. 7 is a diagrammatical view of the circuits for the controlling device of Fig. 5.

The switch for controlling the circuit to the solenoid 81 is arranged to be operated by the device which controls the application of the power to the hoisting drum, which is in the present instance the controller for the motors 4. It is, of course, necessary that the clutch should be set during the hoisting operation and consequently the switch for the solenoid circuit is so arranged that it will not be closed when the controller handle is in its neutral position or any one of its hoisting positions. It is also desirable that the clutch should be set during the lowering operation in order that the energy of the falling dipper may be utilized for braking purposes, this energy serving to operate the motors as generators. Therefore the arrangement of the switch for the solenoid circuit is such that it will be closed only when the controller handle is moved to its last lowering position, thus enabling the clutch to be released at the desired point in the lowering operation. The clutch having been released it is desirable that it should remain released until the controller handle has been returned to its neutral position and we have, therefore, provided means to maintain the solenoid switch closed, when it has been once moved to its closed position, after the controller has been moved off of the last contact and until it has been returned to its neutral position. Our method of accomplishing this is shown more clearly in Figs. 5 and 7. As there shown the circuit comprises a conductor 85 leading from one side of the solenoid 81 to the generator, which is indicated at 86. A second conductor 87 leads from the solenoid to the controller which is indicated as a whole by the reference numeral 88, and which is connected by a conductor 89 with the generator or other source of electrical supply. In Fig. 7 the lowering contact bars are shown diagrammatically on the lefthand side of the drawing and the hoisting contact bars are shown on the righthand side of the drawing. Inasmuch as the hoisting bars do not enter into the operation of the invention they need not be described. The controller may be provided with any desired number of contact positions. In the present instance we have shown but three for hoisting and three for lowering, although ordinarily in a machine of this kind the controller would have six hoisting positions and six lowering positions. The switch for the solenoid circuit comprises a contact member 90 mounted to be moved into engagement with a fixed contact member 91 when the controller is moved to its last position in the lowering direction, thus completing the circuit through the conductors 85—87, the contacts 90—91 and the conductor 89 to the generator. It will be obvious, however, that if the switch 90—91 alone is relied upon to control the solenoid circuit the movement of the controller out of the last lowering position will cause the circuit to be broken and power again applied to set the clutch. To prevent this we have provided means to maintain the circuit closed during the return of the controller to its neutral position. As here illustrated this means comprises a pair of connected contact bars 92 mounted on the movable member of the controller and arranged to be moved into engagement with fixed contacts 93 and 94 whenever the controller is moved into any one of its lowering positions. The fixed contact 94 is connected by a conductor 95 with the negative side 89 of the main circuit, and the fixed contact 93 is connected by a conductor 96 with the positive side 87 of the main circuit, between the solenoid and the switch 90—91. A circuit breaker and closer 97 is interposed in the circuit 96 and is actuated by a lever 98 which constitutes the armature for a magnet 99 and is so arranged that when the armature is attracted to the magnet the circuit breaker and closer 97 will be closed to complete the circuit from the fixed contact 93 to the line 87 of the main circuit. In the present instance the lever 98 constitutes the movable member of a second circuit breaker and closer and when this lever has been attracted to its armature the circuit flows through the two contact members of said second circuit breaker and closer to the circuit breaker and closer 97, but this second circuit breaker and closer is not essential to the operation of the device. The magnet 99 is mounted in a circuit 100 which is connected to the positive side 85 of the main circuit between the generator and the solenoid and with the line 87 of the main circuit between the solenoid and the switch 90—91, hence when the switch 90—91 is closed the magnet will be energized and the circuit breaker and closer 97 closed. Inasmuch as the contact bars 92 are in engagement with the fixed contacts 93 and 94 during all the lowering positions of the controller it will be apparent that the circuit is completed from the generator through the solenoid back to the generator independently of the switch 90 and 91. Consequently after the switch 90—91 is once closed and the magnet energized to close the circuit breaker and closer 97, this circuit breaker and closer will remain closed, and the solenoid will be energized, so long as the switch 92—93—94 is closed, that is, until the controller is returned to neutral position.

Inasmuch as the gear 7 which operates the propelling mechanism for the machine is operated from the hoisting motors it is necessary that the clutch should be released to disconnect the hoisting drum from the motors during the propelling operation, it being understood, of course, that the propelling mechanism is connected with and disconnected from the motors by means of a manually operated clutch. We have, therefore, provided means to close the circuit through the solenoid and thus cause the clutch to be released independently of the controller. To accomplish this we have interposed in the main circuit between the solenoid and the controller, a switch 101 adapted to connect the two parts of the circuit 87 and thus connect the solenoid with the controller, or to connect one part of the circuit 87 with a conductor 102, which is connected with the negative side 89 of the main circuit. When the switch is in this last-mentioned position the circuit will be completed through the solenoid as follows; from generator 86 through the conductor 85, solenoid 81, conductor 87, switch 101, conductor 102 and conductor 89 back to the generator. When the movement of the machine has been completed and it is desired to again resume the operation of the excavating mechanism the switch is shifted to connect the solenoid with the controller.

The operation of the device will be readily understood from the description of the several parts thereof and it will be apparent that we have provided an operating device for clutches, brakes and the like which will be actuated in properly timed relation with the application of power to the part which is controlled by the clutch or brake, and that this mechanism is automatically operated by the controlling device which controls the application of power to said part. Further it will be apparent that the device is simple in its construction and positive in its operation and can be installed and maintained at a low cost.

While we have shown and described one embodiment of our invention we wish it to be understood that we do not desire to be limited to the details of construction as various modifications will occur to a person skilled in the art.

Having now fully described our invention, what we claim as new and desire to secure by Letters Patent, is:

1. In a mechanism of the character described, coöperating gripping members, one of which is movable into and out of engagement with the other, means for rotating one of said members, a controlling device for said rotating means having a plurality of operative positions, means comprising a fluid-operated device to actuate said movable gripping member, a valve to control the flow of fluid to said fluid-operated device, and valve actuating means controlled by said controlling device and arranged to actuate said valve only when said controlling device is in a predetermined one of its operative positions.

2. In a mechanism of the character described, coöperating gripping members, one of which is movable into and out of engagement with the other, means for rotating one of said members, a controlling device for said rotating means, means having a plurality of operative positions comprising a fluid-operated device to move said movable member into operative engagement with said other member, means to move said movable member out of engagement with said other member, valve mechanism to control the flow of fluid to and from said fluid-operated device, electrically operated means to close said valve and permit said coöperating members to be separated, said means comprising a circuit, and a switch to make and break said circuit, said switch being arranged to be actuated by said controlling device for said rotating means to close said circuit only when said controlling device is moved into a predetermined one of its operative positions.

3. In a mechanism of the character described, coöperating friction members, one of which is movable into and out of engagement with the other, a spring tending to move said movable friction member in one direction, a fluid operated device to move said movable member from the other direction against the tension of said spring, a valve to control the flow of fluid to said fluid operated device, a motor for rotating one of said friction members, a controller for said motor, an electro-magnet for actuating said valve, a circuit for connecting said electro-magnet with said controller, said controller having means to make and break said circuit, and means to close the circuit through said electro-magnet independently of said controller.

4. In a mechanism of the character described, coöperating friction members, one of which is movable into and out of engagement with the other, a motor for rotating one of said members, a controller for said motor, means comprising a fluid operated device for actuating said movable friction member, a valve to control the flow of fluid to said device, an electro-magnet to actuate said valve, a circuit for said magnet, a switch actuated by said controller to make and break said circuit, and means to maintain the circuit closed through said electro-magnet after said switch has been opened.

5. In a mechanism of the character described, coöperating gripping members, one of which is movable into and out of engagement with the other, a hoisting motor for rotating one of said members, a controller for said motor having a series of lowering positions, means comprising a fluid operated device to actuate said movable member, a valve to control the flow of fluid to said device, and an electro-magnet to actuate said valve, a circuit for said magnet and a switch connected with said controller and arranged to close the circuit through said magnet when said controller is moved into its last lowering position.

6. In a mechanism of the character described, coöperating gripping members, one of which is movable into and out of engagement with the other, a hoisting motor for rotating one of said members, a controller for said motor having a series of lowering positions, means comprising a fluid operated device to actuate said movable member, a valve to control the flow of fluid to said device, an electro-magnet to actuate said valve, a circuit for said magnet and a switch connected with said controller and arranged to close the circuit through said magnet when said controller is moved into its last lowering position, and means to maintain said circuit closed while said controller is being returned to its neutral position.

7. In a mechanism of the character described, coöperating gripping members, one of which is movable into and out of engagement with the other, a hoisting motor for rotating one of said members, a controller for said motor having a series of lowering positions, means comprising a fluid operated device to actuate said movable member, a valve to control the flow of fluid to said device, an electro-magnet to actuate said valve, a circuit for said magnet, a switch connected with said controller and arranged to close the circuit through said magnet when said controller is moved into a predetermined one of its positions, a second circuit connected across the terminals of said switch to close the circuit through the magnet independently of said switch, a circuit breaker and closer in said second circuit arranged to be closed when said controller is moved from its neutral position, a second circuit breaker and closer in said second circuit, and means to close said second circuit breaker and closer when said controller has been moved into said predetermined position, whereby said electro-magnet will be energized during the return of said controller from said predetermined position to its neutral position.

8. In a mechanism of the character described, coöperating friction members, one of which is movable into and out of engagement with the other, a motor for rotating one of said members, a controller for said motor, means comprising a fluid operated device for actuating said movable friction member, a valve to control the flow of fluid to said device, an electro-magnet to actuate said valve, a source of electrical energy, a circuit to connect said magnet with said source of energy, a switch interposed in said circuit and connected with said controller, said switch being so arranged that it will be closed when said controller is in one position only, a shunt circuit connected in said main circuit across the terminals of said switch to close the circuit through the magnet independently of the switch, a circuit breaker and closer in said shunt circuit adapted to be closed when said controller is in anyone of a plurality of positions, in one of which positions said switch will be closed, a second circuit breaker and closer in said shunt circuit, an electro-magnet to close said second circuit breaker and closer, a circuit for said electro-magnet connected across said shunt circuit between said source of energy and said switch.

In testimony whereof we affix our signatures hereto.

CHARLES B. KING.
BENJAMIN JACOBY.
CHARLES S. JOHNSON.